US007904885B2

(12) United States Patent
Volkmer

(10) Patent No.: US 7,904,885 B2
(45) Date of Patent: Mar. 8, 2011

(54) CHANGE MANAGEMENT FOR STRUCTURE OBJECTS

(75) Inventor: Michael Volkmer, Heidelberg (DE)

(73) Assignee: SAP AG, Walldorf (DE)

( * ) Notice: Subject to any disclaimer, the term of this patent is extended or adjusted under 35 U.S.C. 154(b) by 1021 days.

(21) Appl. No.: 11/689,001

(22) Filed: Mar. 21, 2007

(65) Prior Publication Data

US 2008/0235663 A1 Sep. 25, 2008

(51) Int. Cl.
*G06F 9/44* (2006.01)
(52) U.S. Cl. ......... 717/120; 717/121; 717/122; 717/123; 717/168; 717/169; 717/170
(58) Field of Classification Search ................... 717/120, 717/121, 122, 123, 168, 169, 170; 707/203
See application file for complete search history.

(56) References Cited

U.S. PATENT DOCUMENTS

| | | | | |
|---|---|---|---|---|
| 5,649,200 | A | * | 7/1997 | Leblang et al. ............... 717/122 |
| 5,949,999 | A | * | 9/1999 | Song et al. ................... 717/127 |
| 6,757,893 | B1 | * | 6/2004 | Haikin ......................... 717/170 |
| 2004/0133444 | A1 | * | 7/2004 | Defaix et al. ..................... 705/1 |
| 2004/0186860 | A1 | * | 9/2004 | Lee et al. ....................... 707/200 |
| 2007/0220065 | A1 | * | 9/2007 | Coyle et al. ................... 707/203 |
| 2008/0127089 | A1 | * | 5/2008 | Peretz et al. .................. 717/122 |

OTHER PUBLICATIONS

Antoniol et al, "Identifying the Starting Impact Set of a Maintenance Request: A Case Study", 2002, IEEE, pp. 1-4.*
Knudsen et al, "A Modificaiton Request Control System", Oct. 1976, IEEE Computer Society Press, pp. 187-192.*
Perry et al, "Parallel Changes in Large-Scale Software Development: An Observational Case Study", ACM Transactions on Software Engineering and Methodology, vol. 10, No. 3, Jul. 2001, pp. 308-337.*
Nguyen, "Model-based Version and Configuration Management for a Web Engineering Lifecycle", WWW 2006, May 23-26, 2006, ACM, pp. 437-446.*
Halverson et al, "Designing Task Visualizations to Support the Coordination of Work in Software Development", CSCW'06, Nov. 4-8, 2006, ACM, pp. 39-48.*
Conradi et al, "Version Models for Software Configuration Management", ACM Computing Surveys, vol. 30, No. 2, Jun. 1998, pp. 1-51.*

* cited by examiner

*Primary Examiner* — Emerson C Puente
*Assistant Examiner* — Charles Swift
(74) *Attorney, Agent, or Firm* — Blakely Sokoloff Taylor & Zafman

(57) ABSTRACT

A structure object is locked to prevent changes to the structure object in previous phases of a software life cycle. When a request to change the structure object in a previous phase is received, a change request file is opened. The changed request is approved or denied based at least in part on the previous phase. If the changes request is approved, a document is generated for the change request. Any changes made to the structure object are integrated into the previous phase of the structure object and are also stored in the document. If the change request is denied, the change request file is closed.

20 Claims, 7 Drawing Sheets

CHANGE MANAGEMENT FOR STRUCTURE OBJECTS

FIELD

Embodiments of the invention relate to change management processes and more particularly to change management for structure objects associated with a software life cycle.

BACKGROUND

The life cycle of software generally starts with the implementation phase that consists of blueprint, configuration and testing. After the test phase, the software is used productively in the operations phase where administrative tasks, monitoring and services are performed. If a productive system is upgraded, the blueprint has to be adapted and the life-cycle starts again.

In the first stage of the blueprint phase customers define their scenarios, processes, master data objects, and organizational units, referred to herein as structure objects. These structure objects as well as associated objects (e.g., documents, configuration items, test cases, etc.) assigned to the structure objects are subject to changes during the life-cycle. If one phase (e.g., blueprint) is finished, changes to the structure objects as well as changes to associated objects are generally not tracked. This may cause several problems.

For example, the blueprint defines the scope of a project. At the end of the blueprint phase, the blueprint is frozen and a blueprint document is generated to document the scope of the blueprint. The budget for subsequent phases is based on the information in the blueprint. After the blueprint phase, the project enters a configuration phase. While in the configuration phase, it might become necessary to go back and make changes to the blueprint. Similarly while in a testing phase, it might become necessary to go back and make changes to the configuration phase. This example scenario can exist between any two phases of a software life cycle. The problem, however, is that in traditional change management systems there is no way to request, approve, decline and/or track changes to structure objects in a previously completed phase.

SUMMARY

A process for managing changes to a structure object in one of a plurality of phases of a software life cycle is described herein. The process allows changes to a structure object (e.g., a scenario, process, master data object, organizational unit, etc.) to be request, accepted, denied, and/or tracked. A structure object is locked to prevent changes to that structure object in previous phases of the life cycle. When a request to change the structure object in a previous phase is received, a change request file is opened. Depending on the previous phase for which the change request applies, the change request is approved or denied. If the changes request is approved, a document is generated for the change request to track changes. Any changes made to the structure object are not only integrated into the previous phase of the structure object but they are also stored in the document. Conversely, if the change request is denied, the change request file is closed.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
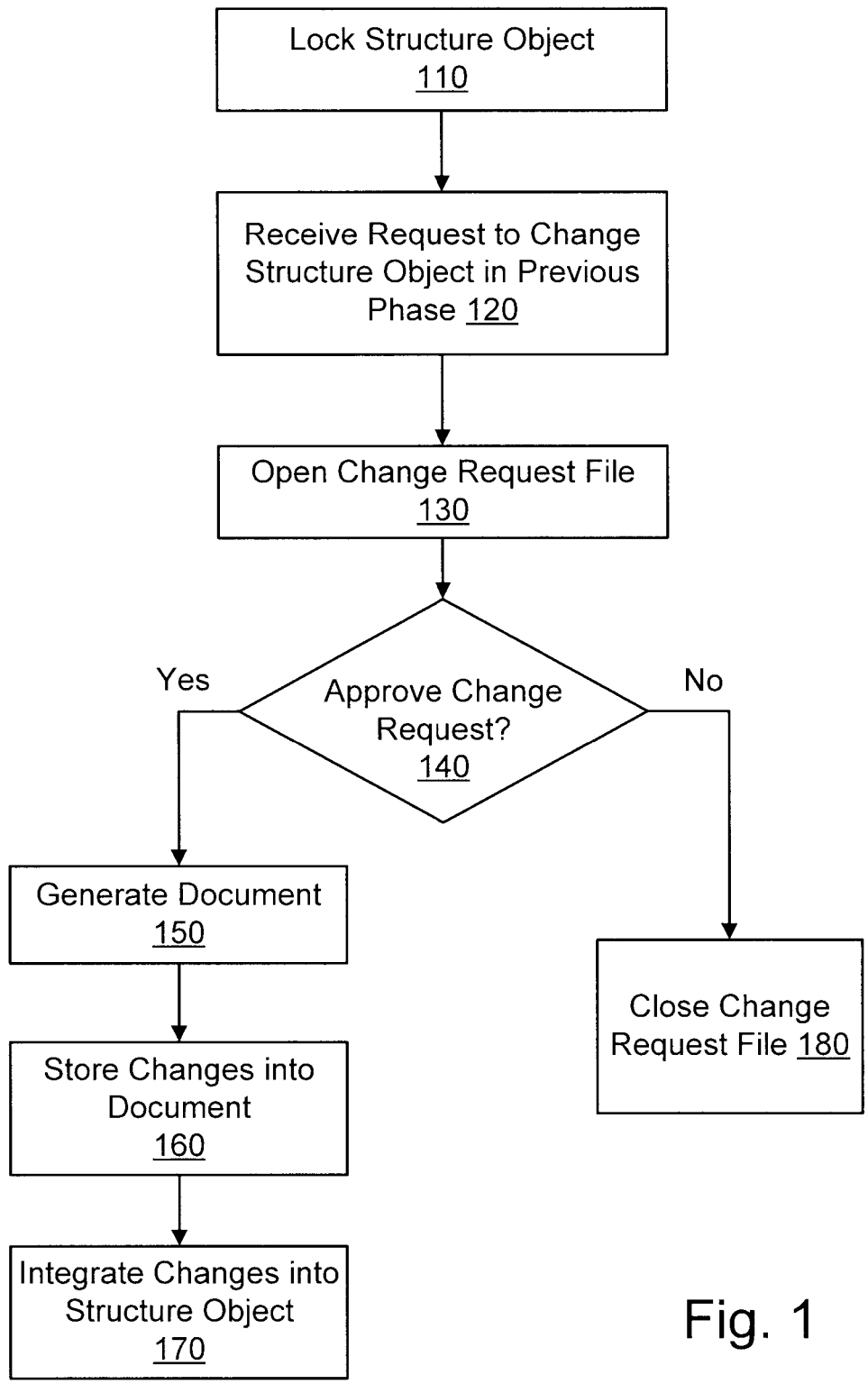
FIG. 1 is a flow diagram illustrating an embodiment of the invention.

Business projects and/or solutions are developed and managed using a platform that provides integrated support for business solution (e.g., software) life-cycles. A platform, as used herein, refers to any framework, whether in hardware or software (or some combination of hardware and software), that facilitates the operation of software. Platforms can be implemented using a single computing device (e.g., desktop, laptop, handheld device, etc.) or they can be distributed over several devices (e.g., servers) on a network. One example of a platform for managing projects is SAP Solution Manager, available from SAP AG of Walldorf, Germany.

In one embodiment, a platform that supports various phases of a software life-cycle is endowed with functionality to support change management for previously completed phases of a project. Changes to objects in previous phases are performed and tracked via change requests. Additionally, changes to objects in the operations phase of a project may be performed and tracked via change requests.

A project starts with a blueprint phase. In this phase, the scope of the project is defined. The final step in the blueprint phase is the sign-off of the blueprint document which can be generated based on the blueprint structure. Changes to the scope of the blueprint after the sign-off can change the scope of the project and may invalidate the signed-off blueprint document. In one embodiment, when the blueprint phase of a project is completed, the blueprint structure is locked against changes during subsequent phases of the project. Locking the blueprint structure may also include locking existing blueprint relevant documents and/or preventing the addition of new blueprint documents.

Each project phase (e.g., blueprint, configuration, testing, etc.) is organized as a hierarchical tree, having tabs for navigating and selecting various activities associated with the project phase. For example, a project phase might have tabs for project documents, structure objects, transactions, administrative tasks, messages, etc. Thus, to lock the blueprint structure and blueprint relevant documents, as discussed above, a user (e.g., administrator) selects the structure tab and the project documents tab and activates a "lock" flag. Every tab associated with a project phase may be selected for locking. "Locking," as used herein, means that no changes are possible. In other words, a locked tab cannot be modified by adding, deleting or changing any aspect of the locked tab.

Once a project phase or any tabs associated with the project phase have been locked, changes can only be made via change request. A new change request can be created or an existing change request can be assigned. If a new change request is created, a user can select which tabs are subject to the change request. The change request is approved (or disapproved) by a change manager (e.g., an administrator, super-user, etc.). The change manager can change the selected tabs within the change request before approving the change request.

If the change request is approved, a change document is created. In one embodiment, a "change document" refers to a document that tracks the history of changes associated with a particular change request. However, a change document may also refer to a document that tracks the history of changes associated with a particular structure object, associated object or combination of these. Only objects associated with the selected tabs in the approved changed request can be changed. Additionally, an approved change request can assign additional users that can use the change request and/or change document to make changes.

For a selected object, a change request or change document might already exist. In this case, a user can select the existing change request or change document if the user is already assigned and if the change request or change document is not already closed. Thus, if a user selects to change an object, the user can either use an existing change request/document or create a new change request.

With respect to a change document, if the user selects an object to change and there is already a change document, then the existing change document is assigned to the user (after approval by a change manager). If no change document exists, the system notifies the user whether there is an existing change request associated with the selected. If there is an existing change request, the user can ask to be assigned to the existing change request; otherwise, a new change request is created.

As discussed above, each structure object (e.g., scenario, process, master data object, organizational unit, etc.) has associated objects (e.g., documents, configuration items, test cases, etc.). Associated objects are linked to structure objects with tabs, in one embodiment. A Scenario can be any end-to-end process (e.g., a manufacturing process, an advertising campaign, a product development process, etc.) involving resources from one or more systems. A master data object, as used herein, refers to a material or resource needed to carry out a scenario. An organizational unit can be any unit of an organization such as a sales organization, manufacturing organization, distribution organization, etc.

In one embodiment, several changes request/documents can exist for the same structure object. However, each structure object tab is only subject to one change request and/or change document at the same time. Once a change document has been assigned to a user, all tabs enabled by the change document become editable by the user.

FIG. 1 is a flow diagram illustrating an embodiment of the technology. In a system for managing changes to a structure object in one of a plurality of phases of a software life-cycle, a structure object is locked against changes in a previous project phase 110. Locking the structure object against changes prevents users from adding, deleting, or modifying objects associated with the structure object without a change request. For example, a project might include a blueprint phase, a configuration phase, a testing phase and an operational phase. After completion of each phase, the structure object is locked against changes in the completed phase. Thus, if the blueprint phase has been completed, changes to the structure object in the blueprint phase are locked during the configuration, testing and operational phases.

A request to change a structure object in a previous project phase is received 120. In response, a change request file that identifies the structure object is opened 130. If a change request already exists for the structure object, the existing change request file is opened. If no change request file exists for the structure object, a new change request file is opened for the structure object.

The change request is either approved or disapproved 140. In one embodiment, the change request is approved or disapproved based at least in part on the previous phase involved in the change request. For example, if a project is in the testing phase, then a change request that involves the immediately preceding phase (e.g., the configuration phase) may be approved. However, a change request that involves the blueprint phase may be disapproved. In another embodiment, the change request is approved or disapproved based at least in part on one or more associated objects selected as part of the change request. In yet another embodiment, the change request is approved or disapproved based on a combination of the phase and the associated objects.

If the change request is approved, a change document is generated 150. Changes to the structure object and/or its associated objects are stored in the change document 160. In addition, changes to the structure object and/or its associated objects are integrated into the structure object in the previous phase 170. If the change request is not approved, the change request file is closed 180.

Figure 2:
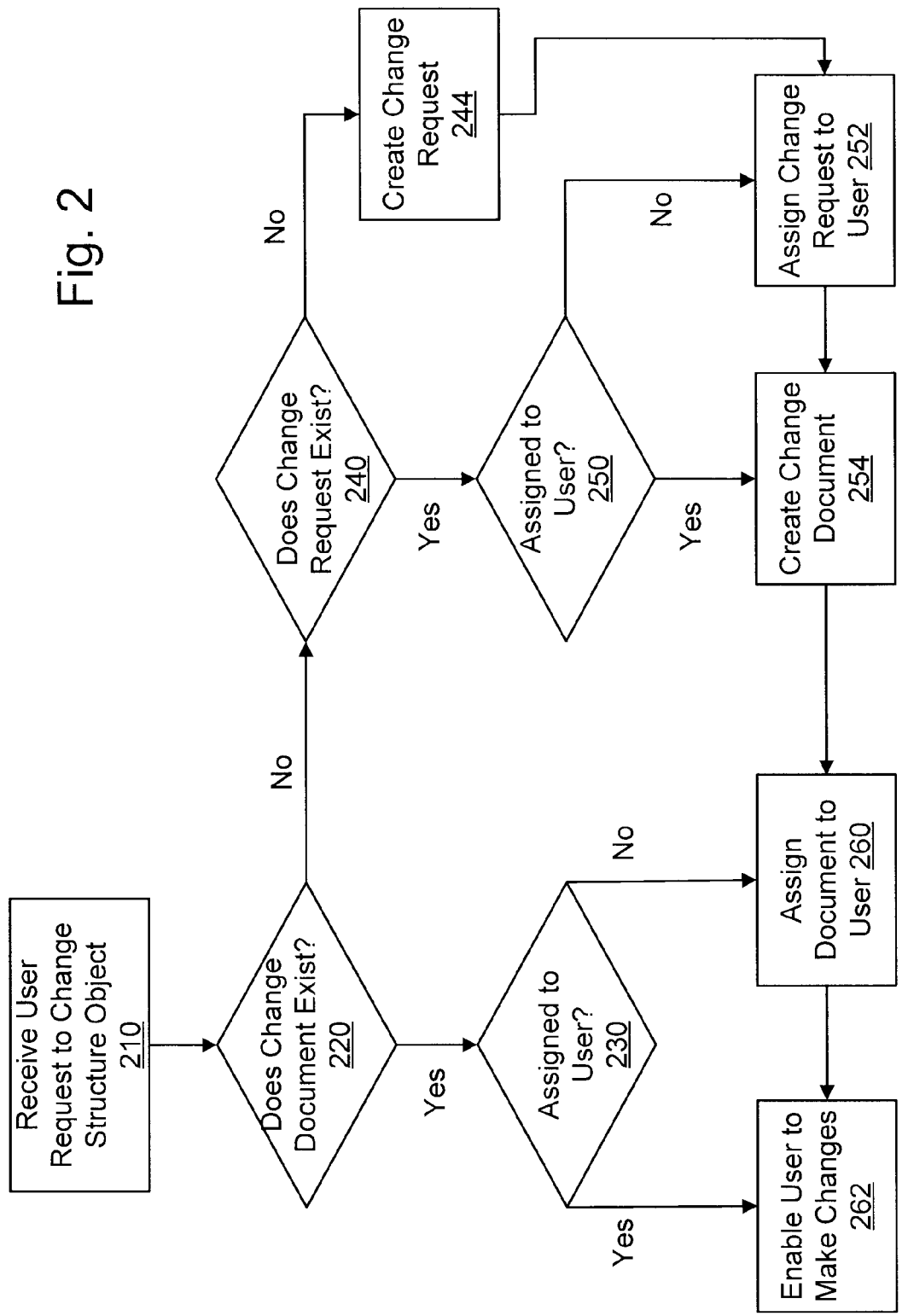
FIG. 2 is a flow diagram illustrating an embodiment of the invention.

FIG. 2 is a flow diagram illustrating one embodiment of the invention. A system receives a user request to change a structure object 210. The system determines whether a change document exists for the structure object 220. If a change document does exist, the system determines whether the change document is already assigned to the requesting user 230. If the document is assigned to the requesting user, the system enables the user to make changes to the structure object 262. If the user is not assigned to the change document, the system assigns the document to the user 260 and then enables the user to make changes to the structure object 262.

When no change document exists for the structure object, the system determines whether a change request exists for the structure object 240. If a change request exists, then the system determines whether the change request is assigned to the user 250. If the change request is assigned to the user, a change document is created 254, the change document is assigned to the user 260 and the user is enabled to make changes to the structure object 262. If the user is not already assigned to the change request, the system assigns the user to the change request 252, a change document is created 254, the user is assigned to the change document 260, and the user is enabled to change the structure object 262.

When no change request exists for the structure object, the system creates a change request 244. The change request is then assigned to the user 252, a change document is created 254, the change document is assigned to the user 260 and the user is enabled to change the structure object 262.

Figure 3:
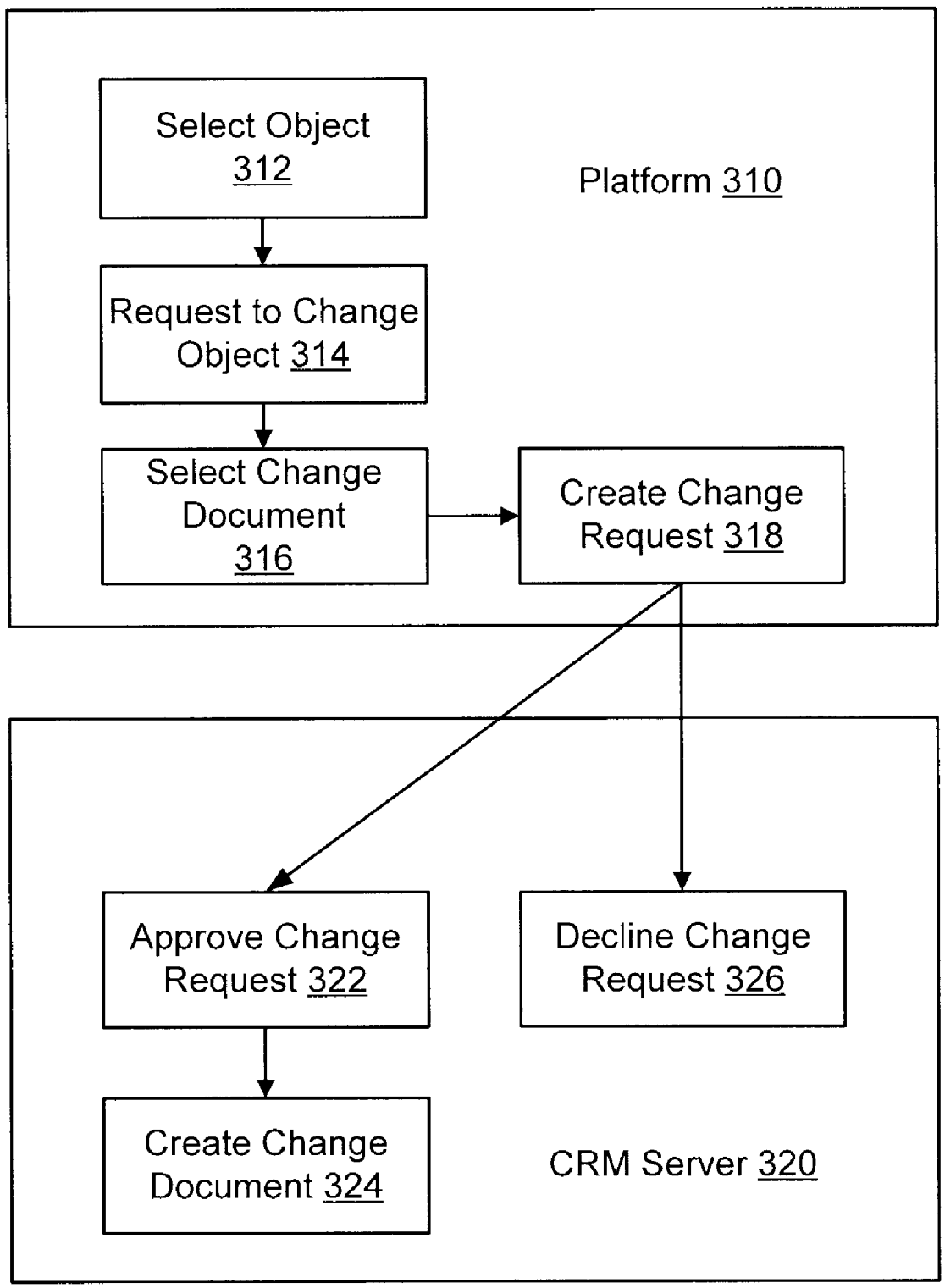
FIG. 3 is a block/flow diagram illustrating an embodiment of a change request.

FIG. 3 illustrates an embodiment of a change request. Platform 310 is a platform for developing and managing business projects and/or solutions and provides integrated support for business solution (e.g., software) life-cycles. Platform 310 can be implemented using any framework, whether in hardware or software (or some combination of hardware and software). Whether implemented in hardware or software (or a combination of hardware and software), platform 310 can be implemented using a single computing device (e.g., desktop, laptop, handheld device, etc.) or it can be distributed over several devices (e.g., servers) on a network. Within the framework of platform 310, an object is selected 312 and a request to change the object is received 314. Platform 310 also supports the selection of a change document 316, if a change request and change document already exists for the object.

If a change request does not exist for the object, platform 310 creates a change request 318. The newly created change request is sent to a change request management (CRM) server 320. CRM server 320 approves the change request 322 or declines the change request 326. In one embodiment, CRM server 320 approves or declines the change request automatically based on project phase, associated objects, etc. In another embodiment, CRM server 320 approves or declines the change request based on receiving administrator input. If the change request is approved, CRM server 320 creates a change document 324 for the object.

Figure 4:
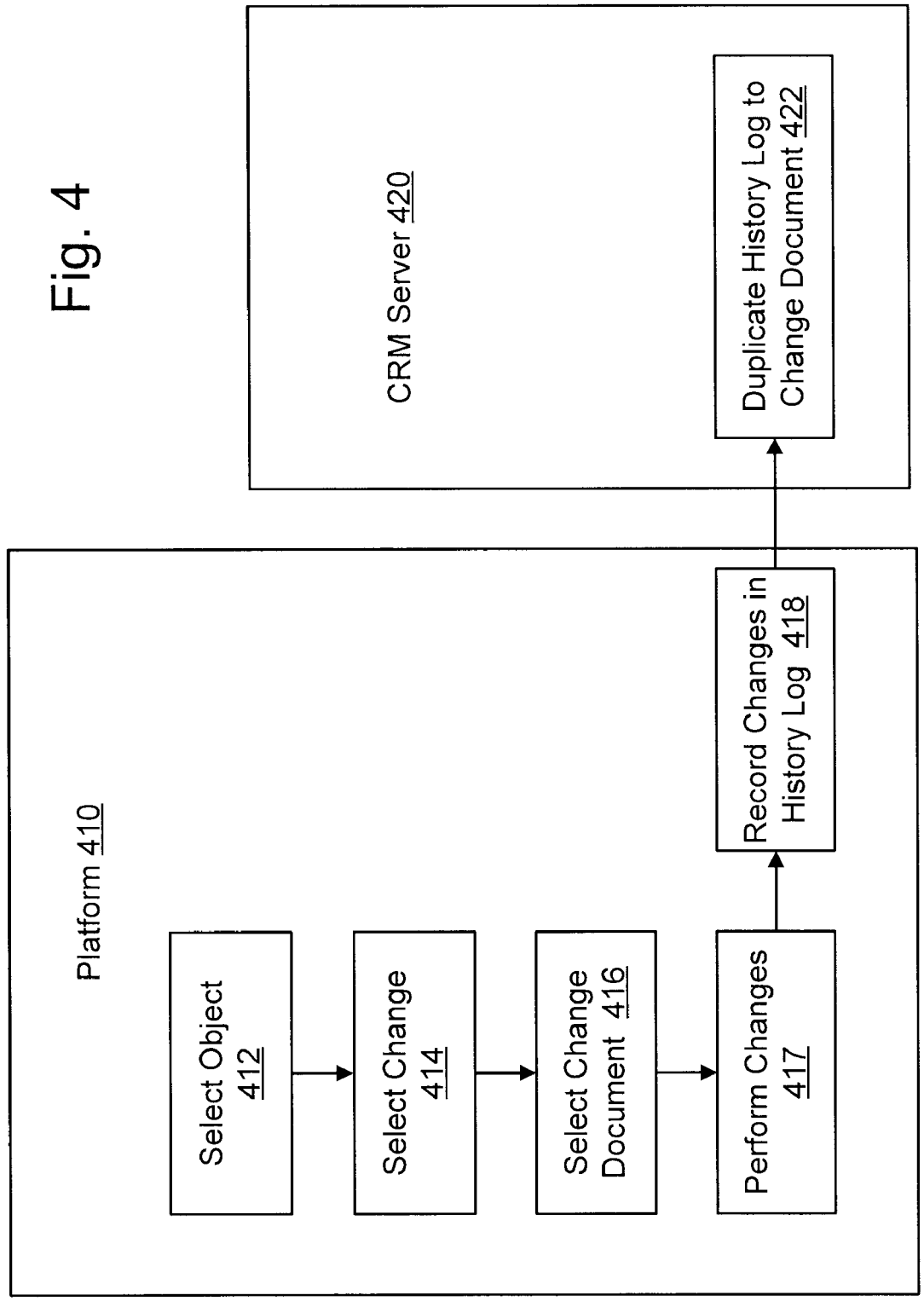
FIG. 4 is a block/flow diagram illustrating an embodiment for performing changes to an object in a previous phase of a software life-cycle.

FIG. 4 illustrates an embodiment for performing changes to an object in a previous phase of a software life-cycle. Platform 410 supports the selection of an object in a previous phase 412 by a user (e.g., via a user interface). For example, a project might be currently in a configuration phase and platform 410 allows the user to select an object in the previous (e.g., blueprint) phase. Once the user has selected an object, the user can select to change the object 414. Platform 410 allows the user to select a change document 416 for the selected object.

Once a change document has been selected, the user is enabled to perform changes 417 to the selected object. Any changes made by the user are recorded into a history log 418 of platform 410. This history log is then duplicated to the change document 422 maintained in CRM server 420.

Figure 5:
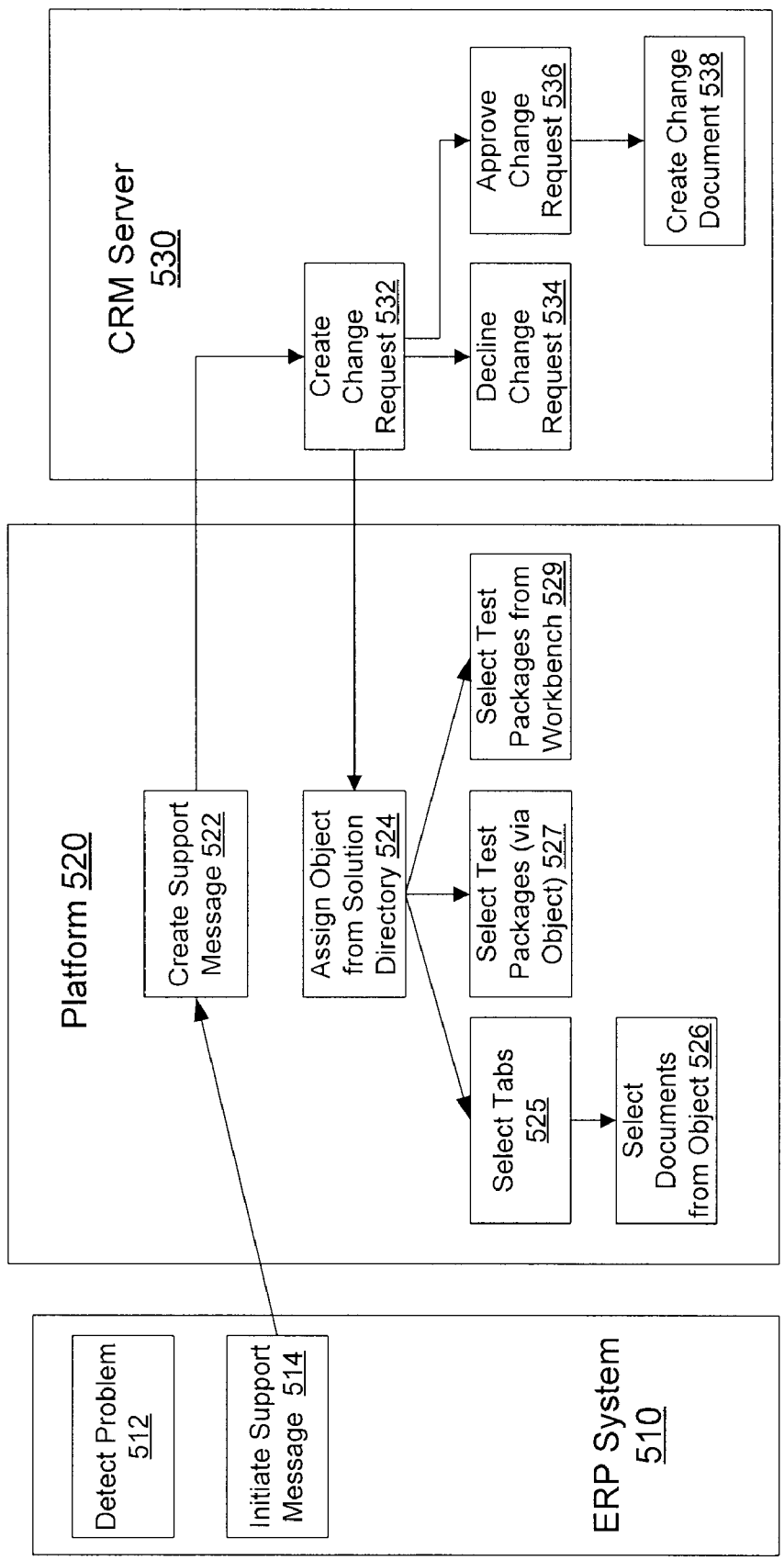
FIG. 5 is a block/flow diagram illustrating an embodiment of a change request triggered by an ERP system.

In one embodiment, a change request is triggered by an enterprise resource planning (ERP) system, as illustrated in FIG. 5. An ERP system, such as ERP system 510, integrates data and processes of an organization into a unified system using both software and hardware. ERP is capable of detecting a system problem 512 (e.g., a problem with a process, etc.). ERP system 510 initiates a support message 514 by communicating the detected problem to platform 520. Platform 520 is a platform for developing and managing business projects and/or solutions and provides integrated support for business solution (e.g., software) life-cycles. In response to receiving notification of the detected problem, platform 520 creates a support message 522.

CRM server 530 is communicatively coupled with platform 520. When platform 520 creates a support message 522, it triggers CRM server 530 to create a change request 532 for the detected problem. In conjunction with the creation of the change request, platform 520 assigns a solution object from a solution directory 524 to the change request. A solution object can be a series of process steps, document(s), or other sub-component(s) of a maintenance project or business process/scenario. In addition to assigning a solution object to the change request, platform 520 allows object tabs 525, test packages (via the object) 527, test packages from a test workbench 529, and relevant object documents 526 to be selected and/or assigned to the change request. The change request is either declined 534 or approved 536 based on the information assigned to the change request. If the change request is approved, a change document is created 538. Thus, the actions taken to address the detected problem are managed by change request and tracked via change documents.

Figure 6:
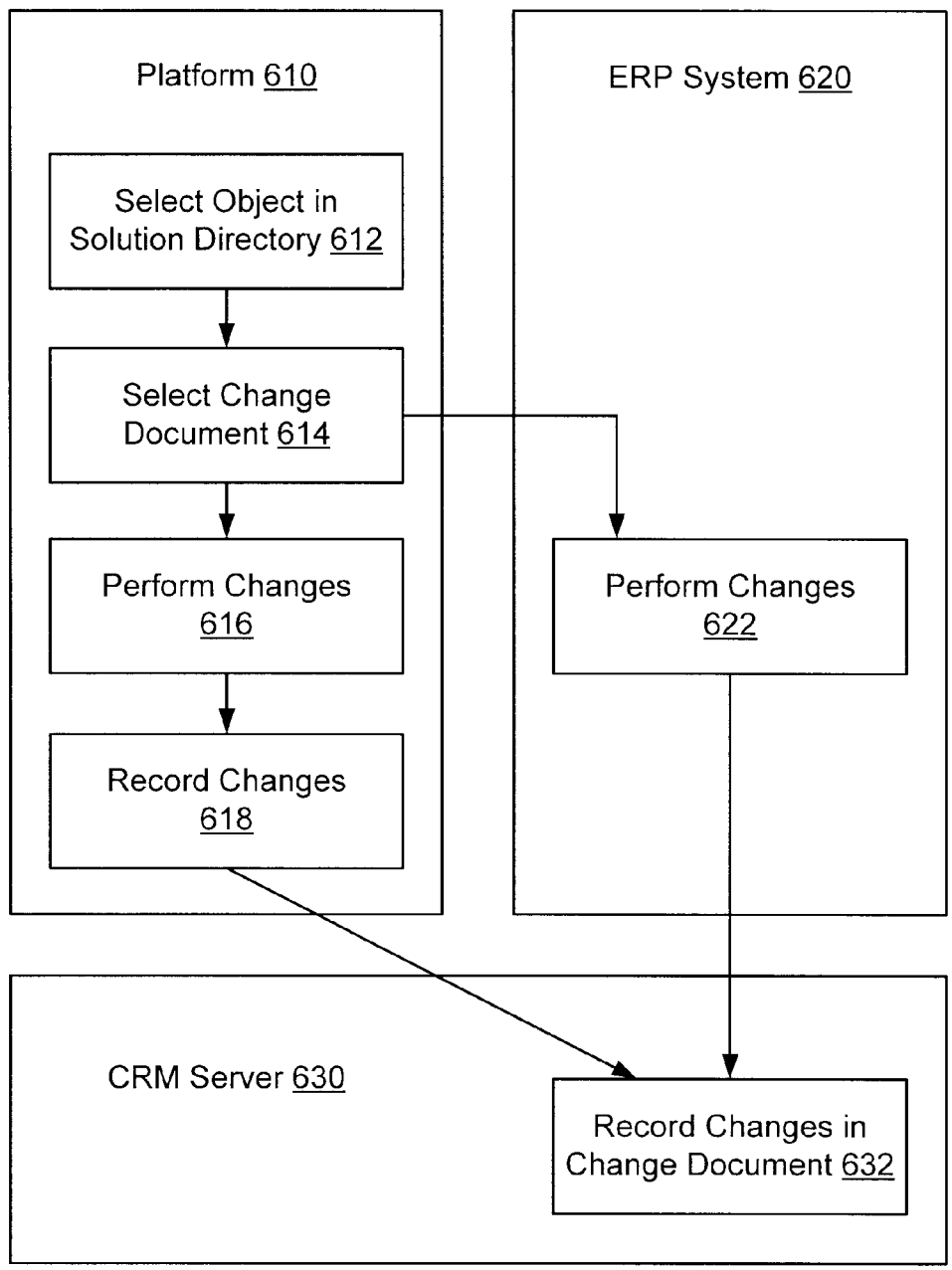
FIG. 6 is a block/flow diagram illustrating an embodiment for performing changes based on a selected object in a solution directory.

The component interactions and process flow for performing changes based on a selected object in a solution directory are illustrated, according to an embodiment, in FIG. 6. Platform 610 supports the selection of a solution object from a solution directory 612. A change document is selected for the solution object 614. Depending on the detected problem and/or the solution, changes are performed 616 on the platform side and/or they are performed 622 on the ERP system side. If changes are performed 622 by the ERP system 620, the changes are communicated to CRM server 630 where they are recorded in the selected change document 632. If changes are performed 616 by the platform 610, those changes are recorded 618 in platform 610 and are communicated to CRM server 630 where they are also recorded in the selected change document 632.

Figure 7:
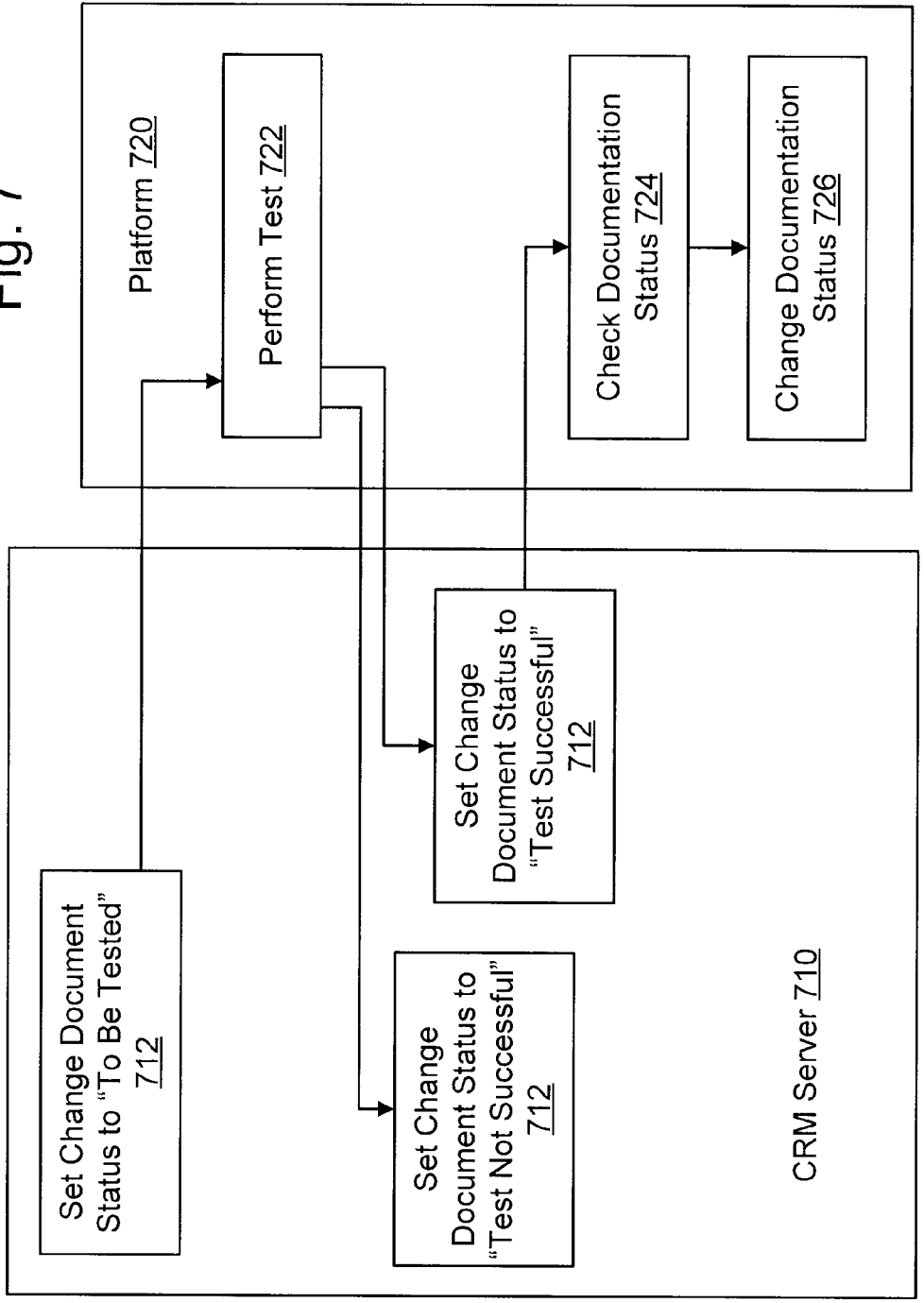
FIG. 7 is a block/flow diagram illustrating an embodiment for performing test changes.

In the embodiment of FIG. 7, CRM server 710 supports setting the status of a change document. For example, if a change to a solution object needs to be tested, the status of the change document can be set to "To Be Tested" 712. The test is performed 722 by the platform 720 and the results are communicated back to CRM server 710. Based on the test results, the status of the change document is set to either "Test Not Successful" 714 or "Test Successful" 716. If a test is performed successfully, the documentation status in platform 720 is checked 724 and updated 726 to reflect the successful test.

Each component described herein may be a means for performing the functions described. Each component described herein includes software, hardware, or a combination of these. The components can be implemented as software modules, hardware modules, special-purpose hardware (e.g., application specific hardware), embedded controllers, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (e.g., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.) A machine readable medium may also include a storage or database from which content can be downloaded. A machine readable medium may also include a device or product having content stored thereon at a time of sale or delivery. Thus, delivering a device with stored content, or offering content for download over a communication medium may understood as providing an article of manufacture with such content described herein.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method for managing changes to a project during a software life-cycle, the method comprising:

creating a plurality of phases representing a project, the phases ordered in time, each phase organized into objects, the objects belonging to one or more phases;

locking the objects in a previous phase to prevent changing the objects in the previous phase during subsequent phases of the project;

receiving a request to change an object in the previous phase during a subsequent phase of the project;

opening a change request file that identifies the object in the previous phase and for which the request was received;

determining whether to approve the change request based on the previous phase, wherein the change request is approved depending on how many phases have transpired between the previous phase and the subsequent phase during which the change request is received; and if the change request is approved,
generating a document for the change request file,
storing one or more changes in the document,
unlocking the object in the previous phase, and
integrating the one or more changes into the object in the previous phase, else, closing the change request file.

2. The method of claim 1, wherein the change request is approved when the previous phase of the object for which the change request was received immediately precedes the subsequent phase during which the change request is received.

3. The method of claim 2, wherein the request to change the object includes a selection of one or more associated objects assigned to the object.

4. The method of claim 3, wherein determining whether to approve the change request further comprises determining whether to approve the change request based at least in part on the previous phase and the selection of the one or more associated objects.

5. The method of claim 1, wherein the object comprises one of a scenario, a process, a master data object, and an organizational unit.

6. The method of claim 3, wherein the one or more associated objects comprise at least one of a document, a configuration item, and a test case.

7. The method of claim 1, wherein the change request file is an existing change request file.

8. An article of manufacture comprising a computer-readable storage medium having content stored thereon to provide instructions to result in an electronic device performing operations including:

creating a plurality of phases representing a project, the phases ordered in time, each phase organized into objects, the objects belonging to one or more phases;

locking the objects in a previous phase to prevent changing the objects in the previous phase during subsequent phases of the project;

receiving a request to change an object in the previous phase during a subsequent phase of the project;

opening a change request file that identifies the object in the previous phase and for which the request was received;

determining whether to approve the change request based on the previous phase, wherein the change request is approved depending on how many phases have transpired between the previous phase and the subsequent phase during which the change request is received; and if the change request is approved,
generating a document for the change request file,
storing one or more changes in the document,
unlocking the object in the previous phase, and
integrating the one or more changes into the object in the previous phase, else, closing the change request file.

9. The article of manufacture of claim 8, further having content to provide instructions to result in the electronic device performing additional operations including:

wherein the change request is approved when the previous phase of the object for which the change request was received immediately precedes the subsequent phase during which the change request is received.

10. The article of manufacture of claim 9, wherein the request to change the object includes a selection of one or more associated objects assigned to the object.

11. The article of manufacture of claim 10, wherein determining whether to approve the change request further comprises determining whether to approve the change request based at least in part on the previous phase and the selection of the one or more associated objects.

12. The article of manufacture of claim 8, wherein the object comprises one of a scenario, a process, a master data object, and an organizational unit.

13. The article of manufacture of claim 10, wherein the one or more associated objects comprise at least one of a document, a configuration item, and a test case.

14. The article of manufacture of claim 8, wherein the change request file is an existing change request file.

15. A computer system for managing changes to a project during a software life-cycle, the system comprising:

a platform distributed over one or more devices in a network, the platform for developing a plurality of phases representing a project, the phases ordered in time, each phase organized into objects, the objects belonging to one or more phases, the platform communicably coupled to a change request management server on the network, the platform and change request management server implementing logic to lock the objects in a previous phase to prevent changing the objects in the previous phase during subsequent phases of the project, wherein responsive to receiving a request to change an object in the previous phase during a subsequent phase of the project; the platform and change request management server implementing logic for further performing:

opening a change request file that identifies the object in the previous phase and for which the request was received;

determining whether to approve the change request based on the previous phase, wherein the change request is approved depending on how many phases have transpired between the previous phase and the subsequent phase during which the change request is received; and if the change request is approved,
generating a document for the change request file,
storing one or more changes in the document,
unlocking the object in the previous phase, and
integrating the one or more changes into the object in the previous phase, else, closing the change request file.

16. The system of claim 15, wherein the change request is approved when the previous phase of the object for which the change request was received immediately precedes the subsequent phase during which the change request is received.

17. The system of claim 16, wherein the request to change the object includes a selection of one or more associated objects assigned to the object.

18. The system of claim 17, wherein determining whether to approve the change request further comprises determining whether to approve the change request based at least in part on the previous phase and the selection of the one or more associated objects.

19. The system of claim 17, further comprising:

an enterprise resource planning system on the network, the enterprise resource planning system communicably coupled to the platform wherein the platform issues a notification to the change request management server about a problem detected in the enterprise resource planning system;

wherein the platform receives the change request from the change request management server in response to the notification; and further wherein the platform includes in the change request the selection of the one or more associated objects assigned to the object, the one or more associated objects including a solution object for solving the problem.

20. The system of claim 15, wherein:

the object comprises one of a scenario, a process, a master data object, and an organizational unit; and the one or more associated objects comprise at least one of a document, a configuration item, and a test case.

* * * * *